United States Patent [19]

Nagel

[11] Patent Number: 5,585,532
[45] Date of Patent: Dec. 17, 1996

[54] METHOD FOR TREATING A GAS FORMED FROM A WASTE IN A MOLTEN METAL BATH

[75] Inventor: Christopher J. Nagel, Wayland, Mass.

[73] Assignee: Molten Metal Technology, Inc., Waltham, Mass.

[21] Appl. No.: 41,491

[22] Filed: Apr. 1, 1993

Related U.S. Application Data

[60] Continuation-in-part of Ser. No. 23,696, Feb. 26, 1993, Pat. No. 5,358,697, which is a division of Ser. No. 737,048, Jul. 29, 1991, Pat. No. 5,191,154.

[51] Int. Cl.$^6$ ................................................ C02F 1/72
[52] U.S. Cl. .................. 588/201; 588/205; 423/210.5; 423/415.1; 423/DIG. 12; 165/104.16; 110/204
[58] Field of Search ........................ 423/210.5, 415.1, 423/415.2, 659, DIG. 12, DIG. 20, 240 S; 588/201, 205; 266/143, 221, 243, 144; 110/204, 346; 165/104.16; 208/48 Q

[56] References Cited

U.S. PATENT DOCUMENTS

| | | | |
|---|---|---|---|
| 1,435,652 | 11/1922 | Murrie . | |
| 3,749,031 | 7/1973 | Burden, Jr. | 110/8 R |
| 3,980,525 | 9/1976 | Knell et al. | 201/29 |
| 4,218,241 | 8/1980 | Hegemann et al. | 75/60 |
| 4,351,275 | 9/1982 | Bhojwani et al. | 122/7 R |
| 4,426,359 | 1/1984 | Woebcke et al. | 422/145 |
| 4,537,626 | 8/1985 | Pfeiffer et al. | 75/35 |
| 4,540,555 | 9/1985 | Franke et al. | 423/242 |
| 4,574,714 | 3/1986 | Bach et al. | 110/346 |
| 4,601,750 | 7/1986 | Robak et al. | 75/65 R |
| 4,602,574 | 7/1986 | Bach et al. | 110/346 |
| 4,681,599 | 7/1987 | Obkircher | 48/92 |
| 4,716,856 | 1/1988 | Beisswenger et al. | 122/4 D |
| 4,846,083 | 7/1989 | Serbent | 110/344 |
| 4,927,459 | 5/1990 | Gardner et al. | 75/685 |
| 4,937,065 | 6/1990 | Maurer et al. | 423/659 |
| 5,086,715 | 2/1992 | Burgin et al. | 110/342 |
| 5,113,772 | 5/1992 | Karasek et al. | 110/345 |
| 5,138,958 | 8/1992 | Sinquin et al. | 110/346 |
| 5,177,304 | 1/1993 | Nagel | 588/201 |
| 5,191,154 | 3/1993 | Nagel | 588/201 |
| 5,227,116 | 7/1993 | Dry et al. | 266/175 |
| 5,238,665 | 8/1993 | Lerner | 423/240 S |
| 5,260,047 | 11/1993 | Berger | 423/245.1 |
| 5,322,547 | 6/1994 | Nagel et al. | 75/414 |
| 5,380,507 | 1/1995 | Hiltunen et al. | 423/240 S |

FOREIGN PATENT DOCUMENTS

| | | |
|---|---|---|
| 0024250 | 2/1981 | European Pat. Off. . |
| 3608005C2 | 11/1988 | Germany . |

OTHER PUBLICATIONS

Abstract 87–000773/01 of German patent DE 35 29 740C 87.01.08.
Abstract 87–178917/26 of European patent 263119–A 88.04.13.

*Primary Examiner*—Gary P. Straub
*Assistant Examiner*—Timothy C. Vanoy
*Attorney, Agent, or Firm*—Hamilton, Brook, Smith & Reynolds, P.C.

[57] ABSTRACT

A method and a system is disclosed for treating a gaseous discharge stream formed from a waste in a molten metal bath. The waste is directed into a reactor containing a molten metal bath. The molten metal bath has operating conditions which are sufficient to dissociate the waste and form a gaseous discharge stream including a dissociation product. The gaseous discharge stream is cooled in a cooling section and the dissociation product is separated, as a particulate, from a gaseous component of the gaseous discharge stream. The fluid particulate stream is recirculated to the gaseous discharge stream in a reaction section of the apparatus.

22 Claims, 2 Drawing Sheets

METHOD FOR TREATING A GAS FORMED FROM A WASTE IN A MOLTEN METAL BATH

RELATED APPLICATION

This is a continuation-in-part of U.S. Ser. No. 08/023,696, U.S. Pat. No. 5,358,697, filed Feb. 26, 1993, which is a divisional of Ser. No. 737,048, filed Jul. 29, 1991, U.S. Pat. No. 5,191,154, filed Mar. 2, 1993, now both of which are hereby incorporated by reference.

BACKGROUND OF THE INVENTION

The Environmental Protection Agency (EPA) has estimated that the annual generation of hazardous wastes is in excess of seventy billion gallons. Hazardous wastes include organic materials, such as polychlorinated biphenyls, pesticides, herbicides, municipal garbage, hospital wastes including pathogens, paints, inks and contaminated solvents, black liquor and explosives. Examples of inorganic wastes include oxides of iron, zinc, copper, lead, magnesium, aluminum, chromium and cadmium, various powdered metal manufacturing residues and metal-containing sludges.

Further, the EPA has classified as toxic, ignitable, corrosive or dangerously reactive many common waste materials, such as paint sludge from appliance factories, dregs of chrome and nickel from metal plating shops, spent raw materials for varnish, carpets and detergents at chemical plants, solvents from dry-cleaned clothes and degreased microchips from computers, mercury from exhausted watch batteries, butane residue from disposable cigarette lighters and lye from cans of oven cleaners.

Landfills are becoming less available as a means of disposing of such wastes. In the absence of suitable landfills, hazardous wastes must be transformed to benign and, preferably, useful development of alternative methods of treating hazardous wastes. Various types of reactors which have been employed for decomposition of hazardous wastes include, for example, liquid injection, multiple hearth, multiple chamber, fluidized bed, molten salt and high efficiency-type boiler reactors. However, many reactors release gases which must be contained or destroyed. Often, these gases are burned, which generally causes formation of free radicals because of the short residence time of the off-gases at flame temperature.

Rotary kilns are a commonly-used type of reactor for combustion of organic wastes. Combustion in rotary kilns typically is initiated by a high temperature flame, whereby reactive species are generated from the organic wastes and then oxidized. However, it is often difficult to contact reactive species with oxygen for oxidation because of poor mixing within the rotary kilns. The rate of destruction of the waste, therefore, can be impeded. Moreover, heat released by combustion occurs away from the flame tip as reacting materials are fed through the rotary kiln, thereby limiting the heat which can be utilized for the initial step of generating reactive species.

Titus, et al., U.S. Pat. No. 3,812,620, disclose a molten pool of glass and miscellaneous metals formed during incineration of "heterogenous waste materials," such as municipal garbage. Various organics in the waste materials are decomposed in the molten pool at temperatures of up to 10,000° F. However, the decomposed materials often are not contacted with oxygen introduced into the molten pool.

Molten salt processes are also known, and are typified by the consumption of solvents and salts in a caustic molten bath into which oxygen and wastes are injected. However, such baths are generally limited to degradation of wastes by chemical reaction rather than thermal destruction. See, for example, U.S. Pat. Nos. 4,447,262, 4,246,255 and 4,017,271.

Oxidation of wastes by reaction of organic materials and oxygen in the presence of water at high temperature and pressure is another method of disposal. See, Wilhelmi, A. R. et al., *Chem. Eng. Prog.*, 75:46–52 (1979). However, inorganic salts, char and metal-containing solids can accumulate at the walls of apparatus employed for such methods, thus necessitating removal of accumulated deposits, causing corrosion and limiting the operating capacity and useful life of such apparatus.

SUMMARY OF THE INVENTION

The present invention relates to a new method and apparatus for treating a gaseous discharge stream formed from a waste in a molten metal bath.

The method includes directing the waste into a molten metal bath within the reactor. The molten metal bath has operating conditions which are sufficient to dissociate the waste and to form a gaseous discharge stream including a dissociation product. The gaseous discharge stream is cooled and the dissociation product is separated as a particulate from a gaseous component of the gaseous discharge stream, thereby forming a particulate stream. At least a portion of the particulate stream is recirculated to the gaseous discharge stream.

The apparatus includes a reactor, having a molten metal bath formed therein, and a gaseous discharge portion above the molten metal bath. A reaction section extends from the gaseous discharge port. A cooling column extends from the reaction section. Separation means are in fluid communication with the cooling section for separating the particulate dissociation product from a gaseous component of a gaseous discharge stream formed from a waste in the reactor, and passing from the reactor through the reaction section and the cooling column into the separation means. A gaseous discharge conduit extends from the separation means. A cooling section extends from the separation means for cooling a particulate stream formed of the particulate dissociation product which has been separated from the gaseous discharge stream in the separation means. A recirculation conduit extends from the cooling section to the reaction section for conducting at least a portion of the particulate stream from the cooling section to the reaction section.

This invention has many advantages. Chemical reaction of the waste causes formation of intermediate components, such as light hydrocarbons, and of atomic constituents. At least a portion of the atomic constituents are reactive with other components of the molten bath, such as oxygen, thereby allowing formation of relatively stable compounds, such as hydrogen gas and carbon monoxide. Heat generated by exothermic reaction of the atomic constituents can be sufficient to initiate additional chemical reaction of waste. Relatively volatile feed can be introduced on top of a molten metal bath for chemical reaction. A substantial portion of any condensable, absorbable, adsorbable or surface-action intermediate components which volatilize and are emitted from the reactor with the off-gas are returned to the molten metal bath for chemical reaction, such as conversion to atomic constituents, and subsequent exothermic reaction of the atomic constituents to form relatively stable compounds.

The molten metal bath can include immiscible metals, allowing selection of combinations of metals according to relative solubility and free energies of oxidation, whereby reaction of reactive components can be controlled to form relatively stable compounds. Chemical, mass and thermal energies can be transferred within the molten bath to create physicochemical environments which can lead to formation of thermodynamically stable compounds at the conditions specified by each phase of a multi-phase molten bath.

The high solubility of resultant compounds in the individual phases of the multi-phase reaction system permits collection of significant amounts of these compounds by the respective phases. Many of the compounds formed can be disposed of by incorporation into a vitreous non-leachable crystallographic matrix of a vitreous layer disposed over the molten metal. Gaseous emissions of deleterious compounds can thereby be further reduced.

Further, recirculating a cooled portion of a particulate bed formed from the off-gas can increase the rate of kinetically-controlled reactions, thereby suppressing dioxin formation. Also, thermodynamically-favored reactions can be suppressed, thereby selectively enhancing the formation of such products as methane. In addition, components of the off-gas, such as fine particles and volatilized heavy metals, can be recovered.

DETAILED DESCRIPTION OF THE INVENTION

The features and other details of the method of the invention will now be more particularly described with reference to the accompanying figure and pointed out in the claims. It will be understood that particular embodiments of the invention are shown by way of illustration and not as limitations of the invention. The principal functions of this invention can be employed in various embodiments without departing from the scope of the invention.

The present invention generally relates to a method and system for controlling decomposition of a feed composition in a molten metal bath. Processes for decomposing waste in molten metal baths are disclosed in U.S. Pat. Nos. 4,574,714, 4,602,574 and 5,177,304, the teachings of which are hereby incorporated by reference.

Figure 1:
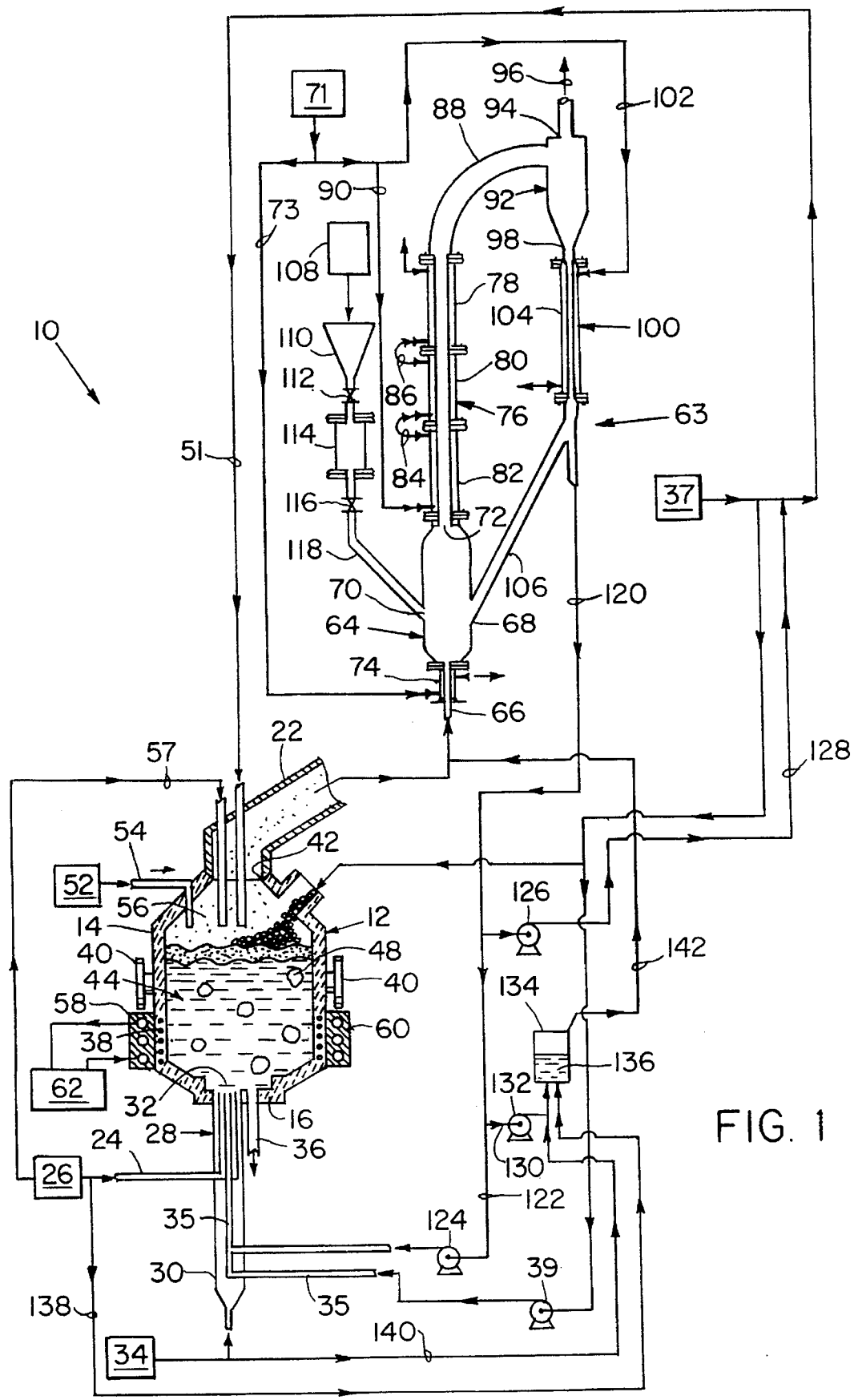
FIG. 1 is a section view of one embodiment of the apparatus of the invention.

In one embodiment of the invention, illustrated in FIG. 1, system 10 includes reactor 12. Examples of suitable vessels include K-BOP, Q-BOP, argon-oxygen decarbonization furnace (AOD), EAF, etc., such as are known in the art. Reactor 12 has an upper portion 14 and a lower portion 16. Feed inlet 18 at upper portion 14 of reactor 12 is suitable for directing feed into reactor 12. Off-gas outlet 22 extends from upper portion 14 and is suitable for conducting an off-gas out of reactor 12.

Tuyere 28 includes coolant tube 30, oxidant inlet tube 24 and feed inlet tube 35. Coolant tube 30 extends from coolant source 34 to reactor 12. Oxidant inlet tube 24 extends from oxidant source 26 to lower portion 16 of reactor 12. Oxidant inlet tube 24 is disposed within coolant tube 30 at tuyere opening 32. Feed inlet tube 35 extends from feed source 37 to tuyere 28. Feed inlet tube 35 is disposed within oxidant inlet tube 24 at tuyere opening 32. Pump 39 is disposed at tuyere 28 to direct a suitable feed from feed source 37 and through tuyere opening 32 into reactor 12. Tuyere 28 is dimensioned and configured for conjointly and continuously introducing a suitable carbon-containing gas and oxidant into reactor 12.

It is to be understood, however, that the coolant and oxidant can be introduced to reactor 12 separately and/or intermittently, rather than conjointly and continuously. It is also to be understood that more than one tuyere 28 can be disposed in reactor 12 and that concentric, or multiple concentric tuyeres, can be employed for separate introduction of reactants, such as feed and oxidant, into reactor 12. For example, the feed can be introduced through a first double concentric tuyere, not shown, and the oxidant can be separately introduced through a second double concentric tuyere, also not shown, as an alternative to employing tuyere 28. Double concentric tuyeres, such as for separate introduction of feed and oxidant, can be located proximately or remotely from each other in reactor 12. Further, it is to be understood that feed can be introduced into reactor 12 by other suitable methods, such as by employing a consumable lance, etc.

In one embodiment, the feed and oxidant are introduced according to the method and system described in U.S. Ser. No. 07/737,199 the teachings of which are incorporated herein by reference.

Bottom-tapping spout 36 extends from lower portion 16 and is suitable for removal of at least a portion of a molten bath from reactor 12. Additional drains can be provided as a means of continuously or intermittently removing distinct molten phases. Material can also be removed by other methods, such as are known in the art. For example, material can be removed from reactor 12 by rotating vessel 12 and employing a launder, not shown, extending from feed inlet 18. Alternatively, the launder can extend into reactor 12 through a tap hole, also not shown.

Induction coil 38 is disposed at lower portion 16 for heating reactor 12 or for initiating generation of heat within reactor 12. It is to be understood that, alternatively, reactor 12 can be heated by other suitable means, such as by oxyfuel burners, electric arc, etc. Trunions 40 are disposed at reactor 12 for manipulation of reactor 12. Seal 42 is disposed between reactor 12 and off-gas outlet 22 and is suitable for allowing partial rotation of reactor 12 about trunions 40 without breaking seal 42. Alternatively, reactor 12 does not include trunions 40 or seal 42 and does not rotate. Reactor 12 is constructed of suitable materials, such as are known in the art.

Molten metal bath 44 is disposed within reactor 12. In one embodiment, molten metal bath 44 includes a metal having a free energy of oxidation, at operating conditions of system 10, which is greater than that of conversion of atomic carbon to carbon monoxide. In one example, molten metal bath 44 includes carbon in an amount in the of between about ½ percent and about six percent by weight. The amount of carbon in molten metal bath 44 can be controlled, for example: by introduction of a feed, which includes carbon and oxidant, to molten metal bath 44; by controlling the rate of removal of off-gas from molten metal bath 44; by controlling system conditions, e.g., temperature, of system 10; by controlling the relative amounts of other components in molten metal bath 44; etc.

Examples of suitable metals in molten metal bath 44 include iron, chromium, manganese, copper, nickel, cobalt, etc. It is to be understood that molten metal bath 44 can include more than one metal. For example, molten metal bath 44 can include a solution of metals. Also, it is to be understood that molten metal bath 44 can include oxides of the molten metals. As disclosed in U.S. Pat. No. 5,177,304, molten metal bath 44 can include more than one phase of molten metal. In one embodiment, molten metal bath 44 is formed of a vitreous phase which includes at least one metal oxide and does not include a molten metal phase. In another embodiment, the vitreous phase can include at least one salt. Alternatively, a substantial portion of molten metal bath 44 can be of elemental metal.

Molten metal bath 44 includes first molten metal phase 46 and second molten metal phase 48, which is substantially immiscible in first molten metal phase 46. Both first molten metal phase 46 and second molten metal phase 48 can comprise solutions of metals. The solubility of atomic carbon in second molten metal phase 48 can be significantly less than in first molten metal phase 46.

First molten metal phase 46 has a free energy of oxidation, at operating conditions of system 10, greater than that of oxidation of atomic carbon to form carbon monoxide. Second molten metal phase 48 has a free energy of oxidation at the operating conditions of system 10 greater than that of oxidation of carbon monoxide to form carbon dioxide. Oxidation of atomic carbon, therefore, is more complete because carbon monoxide, which is formed from atomic carbon in first molten metal phase 46, is substantially converted to carbon dioxide in second molten metal phase 48.

Molten metal bath 44 can be formed by at least partially filling reactor 12 with a suitable metal. The metal is then heated to a suitable temperature by activating induction coil 38 or by other means, not shown. Where two immiscible metals are introduced to reactor 12, the metals separate during melting to form first molten metal phase 46 and second molten metal phase 48. In one embodiment, the viscosity of at least one phase of molten metal bath 44 is less than about ten centipoise at the operating conditions of system 10. In another embodiment, the viscosity of at least one phase of molten metal bath 44 is less than about thirty poise at the operating conditions of system 10.

In one embodiment, suitable operating conditions of system 10 include a temperature sufficient to chemically react waste feed from feed source 37 and thereby form at least one intermediate component. "Intermediate component," as that term is used herein, means a component which is formed from feed and which can be chemically reacted, such as by conversion to atomic constituents, for subsequent reaction with a component of molten metal bath 44. The intermediate component can be, for example, an organic compound or an inorganic compound. In one embodiment, the operating conditions of molten metal bath 44 include a temperature sufficient to cause the free energy of oxidation of metal in molten metal bath 44 to be greater than that of conversion of atomic carbon to carbon monoxide. The temperature of molten metal bath 44 is also sufficient to cause molten metal bath 44 to convert carbon in the intermediate component to atomic carbon.

Vitreous layer 50 is disposed on molten metal bath 44. Vitreous layer 50 is substantially immiscible with molten metal bath 44. Alternatively, system 10 does not include vitreous layer 50. Vitreous layer 50 includes at least one metal oxide, the metal element of which has a free energy of oxidation, at operating conditions of system 10, less than the free energy of oxidation of atomic carbon to carbon monoxide.

The solubility of carbon and of carbon monoxide in vitreous layer 50 can be less than that of molten metal bath 44, thereby causing atomic carbon and carbon monoxide to be retained within molten metal bath 44. In another embodiment, vitreous layer 50 has a lower thermal conductivity than that of molten metal bath 44. Radiant loss of heat from molten metal bath 44 can thereby be reduced to significantly below the radiant heat loss from molten metal bath 44 when no vitreous layer 50 is present.

Examples of suitable metal oxides of vitreous layer 50 include titanium oxide ($TiO_2$), zirconium oxide ($ZrO_2$), aluminum oxide ($Al_2O_3$), magnesium oxide (MgO), calcium oxide (CaO), silica ($SiO_2$), etc. Other examples of suitable components of vitreous layer 50 include halogens, sulfur, phosphorus, heavy metals, etc. It is to be understood that vitreous layer 50 can include more than one metal oxide. Vitreous layer 50 can contain more than one phase. Typically, vitreous layer 50 is substantially fluid and free radicals and other gases can pass across vitreous layer 50 from molten metal bath 44.

Vitreous layer 50 can be formed by directing suitable materials, such as metals, metal oxides, halogens, sulfur, phosphorus, heavy metals, sludges, etc., from source 52 through inlet tube 54 and into molten metal bath 44. Inorganic components of feed 20 can also be included in vitreous layer 50. The materials from source 52 can be directed onto the top of molten metal bath 44 or injected into molten metal bath 44, using methods such as are well-known in the art. The materials can form other stable compounds at the operating conditions of system 10 by reaction, for example, with alkali metal cations or alkaline earth metal cations. Examples of such stable reaction products include calcium fluoride ($CaF_2$) and magnesium phosphate ($Mg(PO_4)_2$). In one embodiment, vitreous layer 50 contains is about forty percent calcium oxide, about forty percent silicone dioxide and about twenty percent aluminum oxide, and is about five inches thick.

Feed, such as a waste in solid or liquid form, is directed from feed source 37 into reactor 12. The feed can be introduced to reactor through line 35, line 51 and/or line 53. Generally, the feed includes organic compounds, such as alkenes, alkanes, etc. Alternatively, the feed can be directed into reactor 12 through inlet 18 as whole articles, such as paper products, lumber, tires, coal, etc. It is to be understood that inorganic compositions can also be used as feed for introduction and chemical reaction in system 10. Suitable examples of inorganic feeds include, but are not limited to, metals and their oxides, sulfides and halides. In addition to carbon, feed can include other atomic constituents, such as hydrogen, halide, metals, etc.

The feed directed into reactor 12 combines with molten metal bath 44 and can also combine with vitreous layer 50. Contact of the feed with molten metal bath 44 or vitreous layer 50 exposes the feed to conditions sufficient to chemically react at least a portion of the components in the feed. Chemical reaction of the feed causes formation of at least one intermediate component.

The feed, oxidant and coolant are directed into molten metal bath 44 through tuyere 28. The feed can also be directed into reactor 16 from feed source 37 through conduit 51. Conduit 51 discharges the feed above vitreous layer 50. Alternatively, conduit 51 can extend within molten metal bath 44 for discharging the feed at a point beneath the surface of molten metal bath 44. The feed is suitable for chemical reaction in molten metal bath 44 to form atomic constituents and at least one intermediate component. In one embodiment, at least one of the atomic constituents formed from the feed is exothermally reactive with a component of molten metal bath 44. For example, the atomic constituents can be reactive with the oxidant introduced to molten metal bath 44 through tuyere 28.

A portion of the oxidant directed into molten metal bath 44 can also react with atomic carbon and other reactive components to form carbon monoxide and carbon dioxide, which are substantially stable at the operating conditions of system 10. Introduction of oxidant into molten metal bath 44 can also cause at least a portion of the intermediate component in molten metal bath 44 to exothermically react with the oxidant to form an oxide. Typically, the stoichiometric ratio of oxidant introduced to system 10 to the oxidizable portion of exothermally reactive components in molten metal bath 44 is greater than about 1:1.

The coolant, such as a suitable shroud gas, is suitable for cooling the region within reactor 16 proximate to tuyere 28 under the operating conditions of system 10. Examples of suitable coolants include nitrogen gas ($N_2$), steam, methane ($CH_4$), chlorobenzene ($C_6H_5Cl$), etc. In one embodiment, chlorobenzene is converted by exposure to molten metal bath 44 to form hydrocarbon-fragment radicals and chlorine radicals.

Gaseous layer 56 is formed over vitreous layer 50. A reaction zone within system 10 includes molten metal bath 44, vitreous layer 50 and gaseous layer 56. Reactants, such as feed and an oxidant, can be introduced anywhere within the reaction zone. Gaseous layer 56 includes off-gas formed in molten metal bath 44 and in vitreous layer 50. Off-gas is formed by oxidation of carbonaceous gas and includes reaction products, such as hydrogen, water vapor, carbon monoxide and carbon dioxide. The off-gas also includes at least one intermediate component which has been entrained or which has been volatilized before decomposition to its atomic constituents within molten metal bath 44. It is to be understood, however, that the conditions of gaseous layer 56 can be suitable for forming at least one intermediate component in gaseous layer 56.

In one embodiment, gaseous layer 56 includes an oxidant, such as oxygen, directed into upper portion 14 from oxidant source 26 through second oxidant inlet tube 57. Atomic constituents formed in molten metal bath 44 and in vitreous layer 50 react with oxidant in gaseous layer 56 or with other materials, such as organic or inorganic compounds, passing through gaseous layer 56. Carbonaceous gases formed within molten metal bath 44, such as carbon monoxide and carbon dioxide, are displaced from molten metal bath 44 as gaseous bubbles. Introduction of oxidant to reactor 12 through second oxidant inlet tube 57 is conducted at a rate sufficient to maintain an oxidant partial pressure in molten metal reactor 12 which allows a substantial portion of atomic carbon in molten metal bath 44 to be oxidized.

A substantial portion of the reaction within reactor 12 occurs within the reaction zone. Exothermic reaction of atomic constituents formed from the feed, such as formation of carbon monoxide and carbon dioxide by reaction of atomic carbon with oxidant, and other exothermic reactions which form inorganic compounds, such as calcium fluoride, generate heat for chemical reaction of the feed and components thereof in the reaction zone.

Heat released by exothermic reaction in the reaction zone can also be transferred out of system 10. In one embodiment, heat is conducted from lower portion 16 to coil 58. Coil 58 is covered by insulation 60, and contains a suitable heat transfer medium, such as water or liquid metal. The heat transfer medium is circulated through coil 58 to thereby transfer heat from molten metal bath 44 to power generating means 62. An example of a suitable power generating means is a steam turbine.

Off-gas formed in reactor 12 is conducted from the reaction zone through off-gas outlet 22 to recirculating fluidized bed reactor 63. Examples of suitable recirculating fluidized bed reactors include those which are commercially available from A. Ahlstrom Corporation, Varkaus, Finland. Recirculating fluidized bed reactor 63 includes reaction vessel 64 having vessel inlets 66,68,70 and vessel outlet 72. Cooling jacket 74 is disposed at vessel inlet 66 for cooling off-gas directed from off-gas outlet 22 through vessel inlet 66 into reaction vessel 64. A suitable cooling medium is directed from cooling medium source 71 through line 73 to jacket 74. Examples of suitable cooling media include, for example, water, ethylene glycol, ethyl benzene, alcohols, etc. Cooling column 76 extends from vessel outlet 70 and includes jackets 78,80,82 which are connected by lines 84,86. Off-gas directed through reaction vessel 64 is discharged from reaction vessel 64 through vessel outlet 72 and is conducted through cooling column 76 to conduit 88 which is connected to cooling column 76. The off-gas is cooled in cooling column 76 by directing cooling medium from cooling medium source 73 through lines 84,86,90 and jackets 78,80,82. The off-gas is then discharged from cooling column 76 and is conducted through conduit 88 to a particle separator, such as cyclone 92.

Particulates in the off-gas at conduit 88, which have either been carried as particulates from the reaction zone through reaction vessel 64 and cooling column 76, or have formed as condensate in either reaction vessel 64 or cooling column 76, are substantially separated from the gas of the off-gas composition in cyclone 92. The gaseous component of the off-gas composition is directed through gaseous outlet 94 of cyclone 92 as a gaseous stream.

The gaseous stream discharged through gaseous outlet 94 can be collected or directed through line 96 for further treatment. Particulates, including dissociation products formed in the reaction zone, are directed through particulates outlet 98 of cyclone 92 and conducted through coolant section 100. The particulates are then carried as a particulate stream through cooling section 100. The particulate stream is cooled in cooling section 100 by cooling medium directed from cooling medium source 71. The cooling medium is directed through line 102 and jacket 104 of cooling section 100. In one embodiment, the particulate stream is cooled to a temperature in the range of between about 100° C. and 300° C. in cooling section 100. At least a portion of the particulate stream is then conducted from cooling section 100 through conduit 106 to reaction vessel 64 for mixing with additional off-gas composition directed from off-gas conduit into reaction vessel 64.

Return of the particulates of the off-gas by recirculating a the particulate stream causes accumulation of particulates in recirculating fluidized bed reactor 63. The particulate stream thereby forms a fluid bed of particulates in reaction vessel 64. Generally, the portion of the particulate stream which is directed from cooling section 100 through conduit 106 to reaction vessel 64 is in the range of between about fifty and one-hundred percent of the total volume of the particulate stream passing through cooling section 100.

In addition to particles which are discharged from reactor 12 through off-gas conduit 22, or which form within the recirculating fluid bed, other particulates can be added to the recirculating fluid bed from particulate source 108.

Examples of suitable particulates include additional dissociation products or other suitable particulates, such as, for example, silica, calcium oxide, etc. The additional particulates are directed from particulate source 108 into hopper 110 and from hopper 110 through valve 112 into make-up vessel 114. The particulates are then directed from make-up vessel 114 through valve 116 in conduit 118 through inlet 70 into reaction vessel 64. An inert gas, such as argon or nitrogen can be employed to assist direction of the additional particulates to reaction vessel 64.

The cooled particulates of the particulate stream are directed into reaction vessel 64 and cool the off-gas directed into reaction vessel 64 from off-gas conduit 22. In one embodiment, the off-gas in reaction vessel 64 is cooled from a temperature in the range of between about 1,000° and 1,500° C. to a temperature in the range of between about 700° and 1,000° C. Volatilized components of the off-gas stream, such as metal oxides, can condense in reaction vessel 64 and cause agglomeration of particulates in the off-gas and in the fluidized particulate stream directed into reaction vessel 64. In addition, chemical reactions can occur in reaction vessel 64. Examples of such chemical reactions include reaction of calcium oxide (CaO), which can be a component of the recirculating fluidized bed, with chlorine gas, which is discharged as an off-gas component from reactor 12. The reaction product is calcium chloride, which precipitates to become a component of the recirculating fluidized bed. In another example, chemical reactions of components in the off-gas are kinetically controlled in reaction vessel 64 because the off-gas is rapidly cooled in reaction vessel 64 by combination of the portion of the particulate stream, which is recirculated to reaction vessel 64. An example of a reaction which is kinetically controlled is formation of ethylene in reaction vessel 64 from methane that is discharged as an off-gas component from molten metal bath 44 in reactor 12. Also, thermodynamically favored reaction off-gas components, can be suppressed by rapid cooling of the off-gas in a kinetically-controlled reaction regime in reaction vessel 64.

The fluid bed and the off-gas combine in reaction vessel 64 and are conducted from reaction vessel 64 through cooling column 76 where additional cooling and condensation of volatilized components of the off-gas continue. Agglomeration of particulates in the combined off-gas and fluidized bed streams can also be caused by continued cooling of the combined streams as they pass through cooling column 76. The resulting cooled mixture is carried from cooling column 76 through conduit 88 to cyclone 92 for additional separation of the gaseous component of the off-gas from particulates. The particulates accumulate and are directed from cyclone 92 through cooling section 100.

In one embodiment, a second portion of the particulate stream which is conducted through cooling section 100 is discharged from recirculating fluidized bed reactor 63 through lines 120,122 by pneumatic transport means 124. The second portion of the particulate stream can then be returned to the reaction zone in reactor 12 through tuyere 28. Optionally, at least part of the second portion can be directed to the reaction zone in reactor 12 from line 122 by pneumatic transport means 126 through lines 128 and line 51. The dissociation products of the particulate stream can include intermediates which can be further dissociated in the reaction zone to form other dissociation products. Alternatively, the dissociation products can react with components of additional waste which is directed into the reaction zone.

Subsequent reactions of the dissociation products which are returned to the reaction zone can be exothermic or endothermic. For example, partially dissociated organics can condense in recirculating fluidized bed reactor 63 and, upon return to the reaction zone in reactor 12, can further dissociate by endothermic dissociation of its components to form its atomic constituents in molten metal bath 44. Other particulates, such as metal-containing compounds, including metal oxides, can react in an endothermic or exothermic manner in the reaction zone.

In embodiments wherein the returned particulate stream has a net endothermic or exothermic effect, the rate of reaction, such as the rate of dissociation of waste directed into reactor 12, can be controlled by controlling the relative amounts of the particulate stream which is returned to the reaction zone. For example, if the net effect of reaction of the particulate stream returned to the reaction zone is exothermic, the temperature of the reaction zone and, thus, the rate of dissociation of waste directed into the reaction zone can be increased by increasing the portion of the particulate stream which is directed into the reaction zone. If the net reaction of the particulate stream in the reaction zone is endothermic, the temperature of the reaction zone, and consequently, the rate of decomposition of waste directed into the reaction zone can be slowed by reducing the rate at which particulates are directed from recirculating fluidized bed reactor 63 to the reaction zone in reactor 12.

In one very specific example, a dust-laden waste gas is directed from reactor 12 to the recirculating fluid bed. The gaseous component of the dust-laden waste gas has a nominal composition of about 50% carbon monoxide gas and 50% hydrogen gas by volume. The normal gas flow rates of the waste gas is in the range of between about 3 and 5 Nm$^3$/min. and is at a temperature in the range of between about 1,400° and 1,650° C. The pressure is in the range of between about 0.5 and 2 atmospheres, absolute. The temperature of gas exiting separation section at outlet is about 300° C. Loading of the recirculating fluidized bed reactor 63 at a gas flow rate of 4 Nm$^3$/min. is about 50 gm/Nm$^3$. Distribution of particle size in the waste gas discharged from the reactor is as follows: 90%<40μ; 45%<10μ; 15%<5μ; 4%<2μ and 2%<1μ. The composition of the particulates in the waste gas is as follows: 84% Fe; 8% CaO; 4% SiO$_2$; 2% MgO; and 2% Al$_2$O$_3$. Vitreous forming materials which have a diameter of less than about one millimeter can be used to supplement the fluid bed. Examples of suitable vitreous materials include, for example, calcium oxide and magnesium oxide. Other components of the waste gas can include, for example, hydrochloric acid, calcium chloride, zinc, lead and chromium oxide.

Optionally, at least a portion of the second particulate stream can be directed from conduit 120 through line 122 and line 130 by pneumatic transport means 132 to reactor 134. Reactor 134 has molten bath 136 disposed therein. In one embodiment, molten bath 136 includes at least one molten metal phase suitable for allowing chemical reaction of the intermediate component, such as conversion of the intermediate component to its atomic constituents and subsequent oxidation of the atomic constituents, at the operating conditions of system 10. Examples of suitable metals of the molten metal phase include metals which are suitable for forming molten metal bath 44. In one embodiment, molten bath 136 includes the same composition as molten metal bath 44 and has a temperature sufficient to chemically react at least a portion of the intermediate component, whereby at least a portion of the intermediate component is converted to atomic constituents and subsequently at least a portion of the atomic constituents react with a component of molten bath 136, thereby controlling chemical reaction of the feed. The reaction between the atomic constituents and the component of molten bath 136 can be exothermic or endothermic.

The second particulate stream is directed into reactor 134 by a suitable method and means, such as by the methods and means which are suitable for directing the second particulate stream into reactor 12. Typically, the second particulate stream is injected into molten bath 136 through a tuyere, not shown. An oxidant is directed from oxidant source 26 through line 138 and a tuyere, not shown, into molten bath 136. Coolant is directed from coolant source 34 through line 140 for injection into molten bath 136, with waste and oxidant, through their respective tuyeres. The off-gas generated in reactor 136 is directed through off-gas conduit 142 to inlet 66 of reaction vessel 64.

Figure 2:
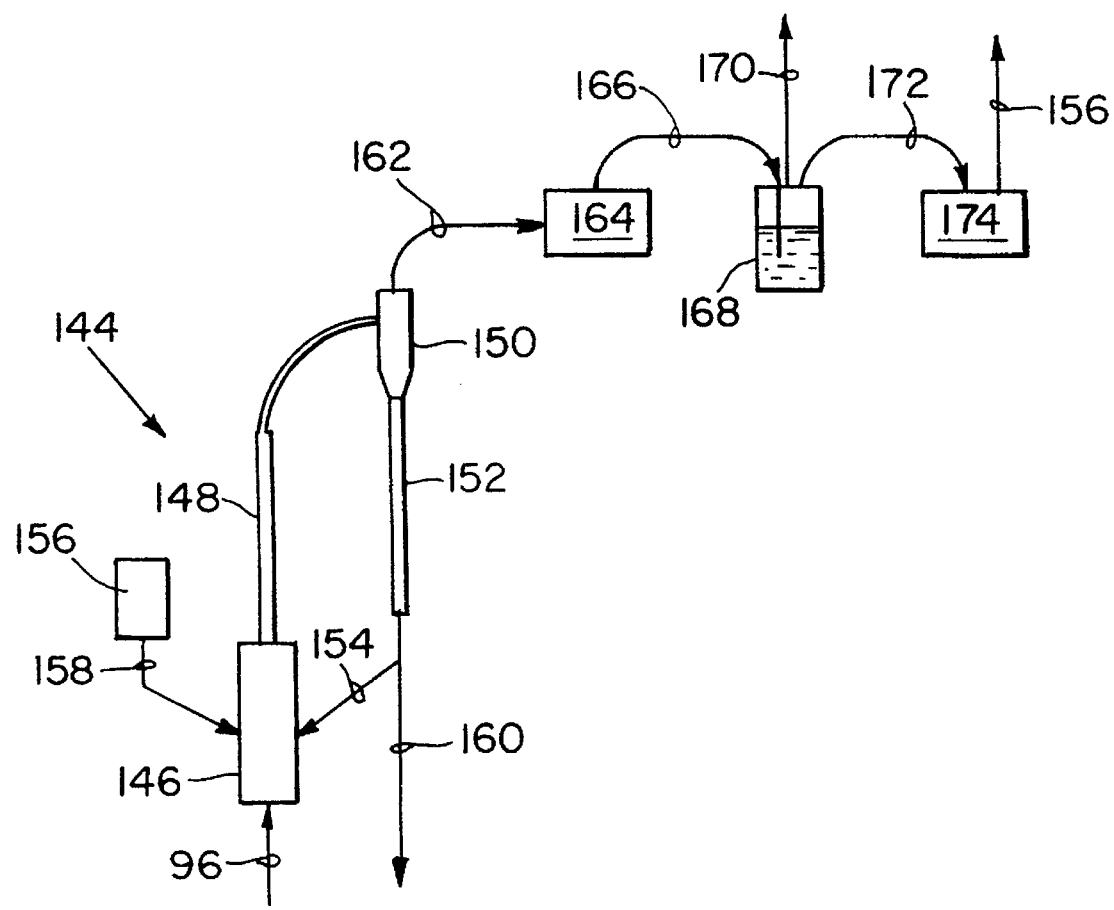
FIG. 2 is a section of one embodiment of apparatus suitable for treating a gaseous stream produced by the apparatus shown in FIG. 1.

As can be seen in FIG. 2, the gaseous stream is conducted through line 96 to second recirculating fluid bed 144. Second recirculating fluidized bed reactor 144 is substantially the same as recirculating fluidized bed reactor 63 shown in FIG. 1 and includes reaction vessel 146, cooling column 148, separation section 150, cyclone 152 and recirculation line 154. A fluid bed is formed in second recirculating fluidized bed reactor 144 by, for example, directing a suitable particulate from particulate source 156 through conduit 158 to reaction vessel 146. Residual particulates in the gaseous stream which enters reaction vessel 146 through line 96 can combine with the recirculating fluidized bed and, thus, separate from the gaseous stream in separation section 150. Selectivity for enhancement of kinetically-controlled reactions and suppression of thermodynamically-favored reaction can be controlled by controlling the make-up, temperature, pressure, and rate of the recirculation.

Also, volatilized components in the gaseous stream can condense in second recirculating fluidized bed reactor 144 and be separated from the gaseous stream to become a component of the fluid bed. At least a portion of the fluid bed is recirculated to reaction vessel 146 through recirculation line 154. Optionally, a second portion of the fluid bed is discharged from recirculating fluidized bed reactor 144 through line 160. The second portion of the fluid bed can then be directed, by pneumatic transport means, not shown, to reaction vessel 68, reactor 12 or reactor 136 for additional processing. The second portion of the fluid bed can be collected for processing or purification of components in the bed by suitable means, not shown.

The gaseous stream discharged from separation section 150 is conducted through line 162 to filtration section 164. In one embodiment, filtration section 164 includes a high-efficiency particle adsorber-type filter (HEPA filter) and a carbon filter. Alternatively, filtration section 164 can include a ceramic porous plug. Examples of components which can be removed from the gaseous stream include volatilized heavy metals which can physico-chemically absorb or adsorb onto the particles of the fluid bed. Also, particles which are not separated from the fluid bed can be removed from the gaseous stream in filtration section 164. From filtration section 164, the gaseous stream is directed through line 166 and seal tank 168, to the atmosphere through vent 170. Optionally, the gaseous stream can be directed from seal tank 168 through line 172 to thermal oxidizer 174 for combustion of any remaining oxidizable component of the gaseous stream and before discharge to the atmosphere through vent 176.

Equivalents

Those skilled in the art will recognize, or be able to ascertain using no more than routine experimentation, many equivalents of the invention described specifically herein. Such equivalents are intended to be encompassed in the scope of the following claims.

I claim:

1. A method for treating a gaseous discharge stream formed from a waste in a molten metal bath, comprising the steps of:
   a) directing the waste into a molten metal bath within a reactor, the molten metal bath causing conversion of at least a portion of a waste to form a gaseous discharge stream that includes at least one intermediate component;
   b) combining the gaseous discharge stream with a fluidized bed of particulates;
   c) cooling the combined gaseous discharge stream and fluidized bed, wherein at least a portion of the intermediate component of the gaseous discharge stream is converted to a particulate product component of the particulates of the fluidized bed;
   d) separating at least a portion of the particulates from the cooled combined gaseous discharge stream and fluidized bed to form a particulate stream that includes at least a portion of said particulate product; and
   e) recirculating at least a portion of the particulate stream to the fluidized bed.

2. A method of claim 1 further including directing a portion of the particulate stream into the reactor.

3. A method of claim 2 further including the step of cooling the particulate stream at a cooling section, to form a cooled particulate stream, wherein at least a portion of the particulates are recycled to the fluidized bed as a component of the cooled particulate stream.

4. A method of claim 3 wherein the particulate stream is cooled to a temperature which causes the particulate stream to cool the gaseous discharge stream, upon recirculation of said particulate stream to the fluidized bed, wherein a substantial portion of at least one intermediate component of the gaseous discharge stream reacts to form a kinetically-determined reaction product.

5. A method of claim 4 wherein an intermediate component of the gaseous discharge stream is methane and a kinetically-determined reaction product includes ethylene formed in the fluidized bed from methane.

6. A method of claim 3 wherein the particulate stream is cooled to a temperature in a range of between about 100° and 300° C., and wherein the cooled particulate stream is mixed with the gaseous discharge stream in the fluidized bed, thereby cooling the gaseous discharge stream from a temperature in a range of between about 1,000° and 1,500° C. to a temperature in a range of between about 700° and 1,000° C.

7. A method of claim 3 wherein the gaseous discharge stream includes an intermediate to formation of a dioxin, and wherein the cooled particulate stream is recirculated to the fluidized bed and contacts the gaseous discharge stream, wherein the gaseous discharge stream is cooled by the cooled particulate stream to a temperature and at a rate which substantially suppresses conversion of the intermediate to said dioxin.

8. A method of claim 1 further including the step of directing at least one particulate from a particulate source to the gaseous discharge stream at the fluidized bed.

9. A method of claim 8 wherein at least one particulate from the particulate source is substantially inert to the intermediate component of the gaseous discharge stream.

10. The method of claim 8 wherein at least one particulate from the particulate source reacts with an intermediate component of the gaseous stream.

11. A method of claim 10 wherein at least one particulate from the particulate source includes calcium oxide and the intermediate component of the gaseous discharge stream is chlorine, wherein the chlorine and the calcium oxide react to form calcium chloride as a particulate product.

12. A method of claim 1 wherein the gaseous discharge stream is sufficiently cooled to cause a volatilized intermediate component to condense.

13. A method of claim 12 wherein the volatilized dissociation product is a heavy metal.

14. A method of claim 1 further including the step of filtering the gaseous discharge stream after a portion of the intermediate component has been removed from the gaseous discharge stream.

15. A method of claim 14 wherein the filtration step comprises directing the gaseous discharge stream through an adsorbent bed.

16. A method of claim 14 wherein the filtration step comprises directing the gaseous discharge stream through a porous plug.

17. A method of claim 14 wherein the filtration step comprises directing the gaseous discharge stream through an activated carbon filter.

18. A method of claim 14 wherein the filtration step comprises directing the gaseous discharge stream through a condenser, wherein a portion of a intermediate component is condensed.

19. A method of claim 1 wherein the particulates is an directing a portion of the particulate stream into a second molten metal bath.

20. A method of claim 1 wherein a portion of the particulate stream is an intermediate component which can react with a component in the molten metal bath.

21. A method of claim 20 wherein the intermediate component reacts exothermically with said component in the molten metal bath.

22. A method of claim 20 wherein the intermediate component reacts endothermically with said component in the molten metal bath.

* * * * *

UNITED STATES PATENT AND TRADEMARK OFFICE
CERTIFICATE OF CORRECTION

PATENT NO. : 5,585,532
DATED : December 17, 1996
INVENTOR(S) : Christopher J. Nagel It is certified that error appears in the above-indentified patent and that said Letters Patent is hereby corrected as shown below:

In Column 14, line 5:   After the words "claim 1", delete the words "wherein the particulates is an" and insert therefor --further including the step of--.

Signed and Sealed this

Fourth Day of March, 1997

Attest:

BRUCE LEHMAN

*Attesting Officer*   Commissioner of Patents and Trademarks